(12) United States Patent
Shepherd et al.

(10) Patent No.: US 12,354,112 B2
(45) Date of Patent: Jul. 8, 2025

(54) TIPPING IN GAMING ESTABLISHMENT RETAIL PURCHASES

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 85 days.

(21) Appl. No.: 17/691,766

(22) Filed: Mar. 10, 2022

(65) Prior Publication Data

US 2023/0316293 A1    Oct. 5, 2023

(51) Int. Cl.
*G06Q 20/42* (2012.01)
*G06Q 20/20* (2012.01)
*G06Q 20/36* (2012.01)
*G06Q 20/40* (2012.01)
*G06Q 50/34* (2012.01)

(52) U.S. Cl.
CPC ............ *G06Q 20/42* (2013.01); *G06Q 20/20* (2013.01); *G06Q 20/36* (2013.01); *G06Q 20/40* (2013.01); *G06Q 50/34* (2013.01)

(58) Field of Classification Search
None
See application file for complete search history.

(56) References Cited

U.S. PATENT DOCUMENTS

| | | |
|---|---|---|
| 7,780,517 B2 | 8/2010 | Saffari et al. |
| 7,905,775 B2 | 3/2011 | Walker et al. |
| 8,725,639 B1* | 5/2014 | Burkhart ............ G06Q 20/351 705/40 |
| 9,916,735 B2 | 3/2018 | Chun |
| 10,430,900 B2 | 10/2019 | Bhattacharjee et al. |
| 10,726,436 B2 | 7/2020 | Stepanovich |
| 11,062,562 B2* | 7/2021 | Shepherd ........... G06Q 20/0457 |
| 11,062,563 B2* | 7/2021 | Shepherd ............ G07F 17/3255 |
| 2007/0060326 A1 | 3/2007 | Juds et al. |
| 2008/0230600 A1* | 9/2008 | Black ..................... G06Q 20/20 235/380 |
| 2009/0055204 A1* | 2/2009 | Pennington ......... G07F 17/3241 348/169 |
| 2009/0055205 A1* | 2/2009 | Nguyen .............. G07F 17/3241 348/169 |
| 2009/0098932 A1* | 4/2009 | Longway .............. G07F 17/322 463/22 |
| 2010/0274678 A1* | 10/2010 | Rolf ...................... G06Q 20/20 705/17 |
| 2012/0310779 A1 | 12/2012 | Flynn |
| 2015/0254627 A1* | 9/2015 | Bell ....................... G06Q 30/02 705/24 |
| 2015/0254628 A1* | 9/2015 | Bell ..................... G06Q 20/202 705/24 |
| 2015/0302388 A1 | 10/2015 | Seidman et al. |
| 2019/0197526 A1 | 6/2019 | Higgins et al. |
| 2020/0372755 A1 | 11/2020 | Shepherd et al. |
| 2020/0402353 A1 | 12/2020 | Higgins et al. |
| 2021/0090200 A1* | 3/2021 | Higgins ................ G06Q 50/34 |
| 2024/0169357 A1* | 5/2024 | Shepherd ........... G06Q 20/3676 |

* cited by examiner

*Primary Examiner* — Fateh M Obaid

(74) *Attorney, Agent, or Firm* — Neal, Gerber & Eisenberg, LLP

(57) ABSTRACT

Systems and methods that operate to enable tipping with gaming establishment retail and entertainment purchases made in association with a gaming establishment fund management system.

20 Claims, 4 Drawing Sheets

TIPPING IN GAMING ESTABLISHMENT RETAIL PURCHASES

BACKGROUND

In various embodiments, the systems and methods of the present disclosure operate to enable tipping with gaming establishment retail and entertainment purchases made in association with a gaming establishment fund management system.

Casinos are associated with multiple different channels of commerce including gaming activities (e.g., wagers on plays of games at electronic gaming machines and gaming tables) and non-gaming activities (e.g., making retail purchases at point-of-sale terminals throughout the casino).

BRIEF SUMMARY

In certain embodiments, the present disclosure relates to a system including a processor, and a memory device that stores a plurality of instructions. When executed by the processor responsive to a request to complete a purchase transaction at a point-of-sale terminal and responsive to a determination that a balance of a gaming establishment account associated with a user includes at least an amount of funds associated with the purchase transaction, the instructions cause the processor to cause a completion of the purchase transaction, wherein the purchase transaction is associated with a first transaction identifier. When executed by the processor following the completion of the purchase transaction and responsive to a completion of a tip transaction associated with the purchase transaction, the instructions cause the processor to associate the first transaction identifier with the completed tip transaction.

In certain embodiments, the present disclosure relates to a system including a processor, and a memory device that stores a plurality of instructions. When executed by the processor responsive to a request, received at a point-of-sale terminal to complete a purchase transaction associated with a first amount of funds and a separate request, received at the point-of-sale terminal, to complete a tip transaction associated with a second amount of funds, the instructions cause the processor to determine if a balance of a gaming establishment account associated with a user includes at least a third amount of funds, the third amount of funds comprising a sum of the first amount of funds and the second amount of funds. When executed by the processor responsive to the balance of the gaming establishment account associated with the user including at least the third amount of funds, the instructions cause the processor to cause a completion of the purchase transaction and the tip transaction as a single transaction.

In certain embodiments, the present disclosure relates to a method of operating a system. Responsive to a request to complete a purchase transaction at a point-of-sale terminal and responsive to a determination that a balance of a gaming establishment account associated with a user includes at least an amount of funds associated with the purchase transaction, the method includes causing, by a processor, a completion of the purchase transaction, wherein the purchase transaction is associated with a first transaction identifier. Following the completion of the purchase transaction and responsive to a completion of a tip transaction associated with the purchase transaction, the method includes associating, by the processor, the first transaction identifier with the completed tip transaction.

Additional features are described herein, and will be apparent from the following Detailed Description and the figures.

DETAILED DESCRIPTION

Figure 1:
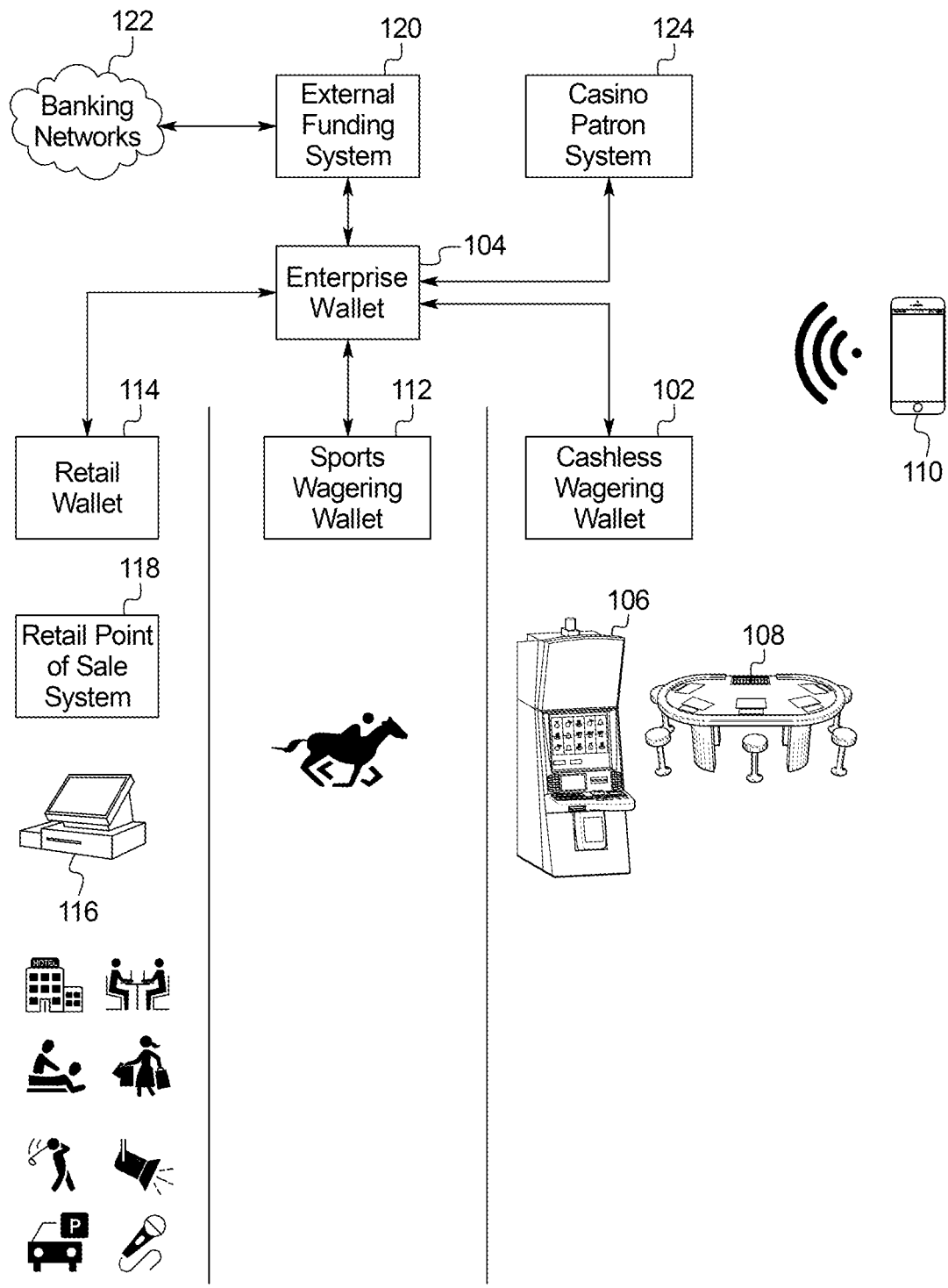
FIG. 1 is an example configuration of the architecture of a plurality of different components of the system of the present disclosure.

In various embodiments, the systems of the present disclosure operate to enable tipping with gaming establishment retail and entertainment purchases made in association with a gaming establishment fund management system.

In certain embodiments, in association with a purchase transaction that utilizes funds in a gaming establishment account (e.g., a gaming establishment retail account or a cashless wagering account) to purchase goods and/or services at a touchpoint associated with a gaming establishment, the system enables a tip to be made via a tip transaction that also utilizes funds in the gaming establishment account. In certain such embodiments, to enable a user to provide one or more tips in association with a retail transaction with funds drawn from a gaming establishment account (that, as described below, presents various technical obstacles to such tipping), the system utilizes multiple linked transactions to offer while remaining in compliance with various attributes associated with the gaming establishment account.

More specifically, while providing a tip may be customary in association with certain goods and/or services purchased using funds associated with a non-gaming establishment account, such as a credit card or debit card, certain attributes of a gaming establishment account hinder the capability of offering tips with funds held in such a gaming establishment account. These attributes of the gaming establishment account differ from attributes of a non-gaming establishment account and cause various technical challenges to tipping on purchases made in association with the gaming establishment account.

For example, in a purchase of a good and/or service using a credit card and/or a debit card that includes a tip, a transaction is authorized for the purchase amount at a first point in time, but the transaction is not settled against the account associated with the credit card and/or debit card until a second, later point in time after an amount of a tip has been made and can be added to the purchase amount. While such an extended period of time between the purchase of a good and/or service and the settlement or completion of the purchase enables tips to be added to the purchase amount for transactions associated with credit cards and debit cards, gaming establishment accounts offer no such extended periods of time between a time of purchase and a time of settlement or completion for that purchase. Rather, when a purchase is made against funds held in a gaming establishment account, the gaming establishment fund management system locks the gaming establishment account until the transaction settles and fund are withdrawn from the gaming establishment account for the amount of the purchase. As such, the settlement timing of a purchase of goods and/or services made with funds in certain gaming establishment accounts prevent the employment of adding a tip to such purchases using funds held in a gaming establishment account.

In another example, while a purchase of a good and/or service using a credit card (i.e., an instrument tied to a line of credit offered by the financial institution that issued the credit card) may be authorized for an amount greater than the final charge amount (e.g., an authorization amount may be up to 120% of the final charge amount), a purchase of a good and/or service associated with a gaming establishment account does not enable such an authorization of any amount greater than the purchase amount. Similarly, while a purchase of a good and/or service using a debit card (i.e., an instrument tied to financial institution account that offers overdraw protection if a purchase exceeds a balance of the financial institution account) may be authorized for an amount greater than the final charge amount (e.g., an authorization amount may be up to 120% of the final charge amount), as indicated above, a purchase of a good and/or service associated with a gaming establishment account does not enable such an authorization of any amount greater than the purchase amount. As such, the lack of any authorization of any amount greater than the purchase price of a purchase of goods and/or services made with funds in certain gaming establishment accounts further prevents the employment of adding a tip to such purchases using funds held in a gaming establishment account.

In view of at least these differences between gaming establishment accounts and non-gaming establishment accounts and the technical challenges presented with gaming establishment accounts, the system of the present disclosure provides one or more avenues for enabling tips to be added to purchases made with funds from such gaming establishment accounts. In certain embodiments, the system enables tipping by utilizing a first transaction associated with the amount of the original purchase (i.e., the purchase transaction) and then, after a settlement or completion of the first transaction, further utilizing a second, linked transaction associated with the amount of the tip (i.e., the tip transaction). In these embodiments, to enable the gaming establishment fund management system to reconcile these two sequentially occurring transactions (such that they are presented to the user as a single transaction and do not otherwise burden the user), the gaming establishment fund management system associates an identifier of the purchase transaction, such as a transaction identification, with the tip transaction. In certain other embodiments, the system enables tipping by utilizing a single transaction associated with the amount of the original purchase and the amount of the tip that are settled collectively against the gaming establishment account. In these embodiments, to enable the gaming establishment fund management system to offer such tipping, the gaming establishment fund management system utilizes an identifier of the purchase transaction, such as a transaction identification, as the identifier of the tip transaction and further provides that settlement of the amount of the original purchase occurs with the settlement of the amount of the tip.

Accordingly, in view of the recognized constraints of how gaming establishment accounts process transactions, the system of the present disclosure enables tipping transactions to occur while staying withing the confines of such constraints. That is, given the specific timing restrictions and/or authorized amount restrictions that gaming establishment accounts utilize in the settlement of funds drawn from such gaming establishment accounts, the present disclosure enables one or more tips to be made in association with a purchase of goods and/or services with funds drawn from such gaming establishment accounts while remaining in compliance with such specific time restrictions and/or authorized amount restrictions. Such a configuration of enabling both purchases of goods and/or services and the accompanying tips using funds in one or more gaming establishment accounts overcomes various security concerns associated with cash-based retail transactions (e.g., protecting patrons carrying cash to retail establishments) and encourages patrons to participate in an alternative, non-cash-based option for the patron to purchase goods and/or services from a retail establishment, thereby expanding the cashless ecosystem certain gaming establishments strive for.

In various embodiments, the present disclosure is directed to a gaming establishment fund management system including various components or sub-systems that are each associated with or otherwise maintain one or more electronic or virtual accounts. In these embodiments, the various accounts maintained for a user collectively form a resort or enterprise account (i.e., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a retail patron, collectively form a resort or enterprise account (i.e., an integrated resort or gaming establishment fund management wallet) that the user may access to transfer funds and/or view balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In certain embodiments, the gaming establishment fund management system includes a first cashless wagering system that maintains a first cashless wagering account. In these embodiments, a user, such as a player of an electronic gaming machine ("EGM"), utilizes a mobile device application running on a mobile device and/or a physical instrument (e.g., a smart card or a user issued magnetic striped card which the user utilizes via inserting the card into a player tracking unit associated with the EGM) to facilitate the electronic transfer of any funds between this first cashless wagering account and a gaming device, such as a component of a gaming table and/or an EGM (including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities)). For example, as seen in FIG. 1, the gaming establishment fund management system includes a first cashless wagering system (not shown) that maintains a Cashless Wagering Wallet 102 (e.g., a first cashless wagering account) which is in communication with the enterprise wallet 104. In this example, to facilitate the transfer of funds from this cashless wagering account to a credit balance of an EGM 106 and/or a credit balance of a gaming table component (not shown)

associated with a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic striped card which the user utilizes via inserting the card into a kiosk) to facilitate the electronic transfer of any funds between this second cashless wagering account and a credit balance accessible to wager on sporting events and/or games of chance (or games of skill) remote from an EGM and a gaming table. For example, as seen in FIG. 1, the gaming establishment fund management system includes a second cashless wagering system (not shown) that maintains a Sports Wagering Wallet 112 (e.g., a second cashless wagering account) which is in communication with the enterprise wallet 104. In this example, to facilitate the transfer of funds from this cashless wagering account to a credit balance associated with a sporting event wagering system (not shown) and/or a remote wagering system (not shown) to enable the placement of one or more wagers on one or more sporting events and/or one or more games of chance (or games of skill), the system utilizes a mobile device 110 running a mobile device application that interfaces with one or more components of the gaming establishment fund management system to enable a user, such as a user remote from the gaming establishment, access to this second cashless wagering account.

In various embodiments, in addition to or an alternative of maintaining one or more cashless wagering accounts via one or more cashless wagering systems, the gaming establishment fund management system includes or is otherwise associated with one or more gaming establishment retail wallet systems that each maintain one or more gaming establishment retail accounts. Such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services (as well as provide tips in association with such purchases) via the user's gaming establishment retail account. For example, as seen in FIG. 1, the gaming establishment fund management system includes a gaming establishment retail wallet system (not shown) that maintains a Retail Wallet 114 (e.g., a gaming establishment retail account) which is in communication with the enterprise wallet 104. In this example, to facilitate the transfer of funds from this gaming establishment retail account to an account associated with a retailer to purchase goods and/or services from the retailer as well as provide one or more tips in association with such purchases, the system utilizes a retail wallet identity, such as a mobile device 110 running a mobile device application that interfaces with a point-of-sale terminal 116 of a retail point-of-sale system 118 of the retailer and/or a physical instrument (e.g., a smart card or a user issued magnetic striped card which the user utilizes in association with the point-of-sale terminal), and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a retailer as well as provide tips to personnel of the retailer.

In certain embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services and provide tips via the user's gaming establishment retail account. Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services and provide tips, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services and provide tips wherein such funds deposited in the gaming establishment retail account may be converted to or otherwise redeemable for cash or check.

In certain embodiments, the gaming establishment retail wallet systems which maintain one or more gaming establishment retail accounts are associated with zero, one or more tipping controls or restrictions which facilitate any provided tips and prevent unauthorized tipping of the funds in such gaming establishment retail accounts. In certain embodiments, the retail point-of-sale systems are additionally or alternatively associated with zero, one or more tipping controls or restrictions which facilitate any provided tips and prevent unauthorized tipping through such retail point-of-sale systems. In certain embodiments, the gaming establishment fund management system which maintains one or more gaming establishment accounts is associated with zero, one or more tipping controls or restrictions which facilitate any provided tips and prevent unauthorized tipping of the funds in any gaming establishment retail accounts. In these embodiments, the gaming establishment retail wallet system, the retail point-of-sale system and/or the gaming establishment fund management system are in communication with or otherwise associated with one or more gaming establishment tipping control systems to ensure that one or more purchases made using funds from a gaming establishment retail account comply with one or more tipping restrictions associated with the use of such funds.

In certain embodiments, the gaming establishment tipping control system is a separate system that operates with the gaming establishment retail wallet system, the retail point-of-sale system and/or the gaming establishment fund management system to verify the authenticity of one or more tipping transactions involving funds from a gaming establishment retail account. In these embodiments, the gaming establishment retail wallet system, the retail point-of-sale system and/or the gaming establishment fund management system interrogates the gaming establishment tipping control system before authorizing a transaction involving funds from a gaming establishment retail account to determine whether or not any tipping controls or restrictions are in place and if so, how such tipping controls or restrictions affect the potential action by the gaming establishment retail wallet system, the retail point-of-sale system and/or the gaming establishment fund management system.

In certain other embodiments, the gaming establishment tipping control system is part of or otherwise built into the gaming establishment retail wallet system, the retail point-of-sale system and/or the gaming establishment fund management system and operates to verify the authenticity of one or more tipping transactions involving funds from a gaming establishment retail account. In these embodiments, before authorizing a tipping transaction involving funds from a gaming establishment retail account, the gaming establishment tipping control system (i.e., a component of the gaming establishment retail wallet system, the retail point-of-sale system and/or the gaming establishment fund management system) determines whether or not any tipping controls or restrictions are in place and if so, how such tipping controls or restricts affect the potential action by the gaming establishment retail wallet system, the retail point-of-sale system and/or the gaming establishment fund management system. It should be appreciated that in different embodiments, any component or sub-system of the present disclosure can be in communication with one or more tipping control systems.

In certain embodiments, the gaming establishment fund management system is in communication with one or more external funding sources which maintain one or more external accounts for the user. For example, as seen in FIG. 1, the gaming establishment fund management system that maintains the enterprise wallet 104 is in communication with an external funding system 120 which is in communication with a network of one or more banks or other financial institutions (i.e., the banking networks 122) which operate to electronically transfer funds to/from the user's accounts maintained at such banks or financial institutions to/from one or more of the accounts maintained by the gaming establishment fund management system. In certain embodiments, such external accounts include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). It should be appreciated that while illustrated as the gaming establishment fund management system being in communication with one or more external funding sources, in different embodiments, any component or sub-system of the present disclosure can be in communication with one or more external funding sources. In different embodiments, the system utilizes a mobile device running a mobile device application, a kiosk, a gaming device, a service window displayed by a gaming device (e.g., a remote host controlled service window displayed by an EGM), a component of a gaming establishment patron management system, such as a player tracking unit, and/or a gaming establishment interface to facilitate the transfer of funds to/from an external account.

In certain embodiments, the gaming establishment fund management system is in communication with one or more gaming establishment patron management systems. For example, as seen in FIG. 1, the gaming establishment fund management system (i.e., enterprise wallet 104) is in communication with one or more gaming establishment patron management systems (i.e., the casino patron system 124) that monitor activities at various points of contact associated with the gaming establishment and provides rewards, such as redeemable player tracking points, in association with such activities. It should be appreciated that while illustrated as the gaming establishment fund management system being in communication with one or more gaming establishment patron management systems, in different embodiments, any component or sub-system of the present disclosure can be in communication with one or more gaming establishment patron management systems. In different embodiments, the system utilizes a mobile device running a mobile device application, a kiosk, a gaming device, a service window displayed by a gaming device (e.g., a remote host controlled service window displayed by an EGM), a component of a gaming establishment patron management system, such as a player tracking unit, and/or a gaming establishment interface to interface with the gaming establishment patron management system.

In certain embodiments (not shown), the gaming establishment fund management system is in communication with one or more credit systems which each issue the user one or more lines of credit or markers. In these embodiments, to facilitate a transfer of funds from the line of credit issued by the credit system to a cashless wagering account (and then to a credit balance of an EGM and/or a credit balance of a gaming table component (not shown) associated with a gaming table) and/or to facilitate a transfer of funds from the line of credit issued by the credit system to a gaming establishment retail account (and then to a point-of-sale terminal of a retail point-of-sale system of a retailer), the system utilizes a mobile device running a mobile device application that interfaces with one or more components of the credit system and/or a physical instrument (e.g., a smart card or a user issued magnetic striped card) to enable a user, such as a player of the EGM or a player at the gaming table, to apply for a line of credit and/or access an amount of funds associated with an issued line of credit. It should be appreciated that in different embodiments, any component or sub-system of the present disclosure can be in communication with one or more credit systems.

In certain embodiments (not shown), the gaming establishment fund management system is also in communication with one or more credit reporting/credit risk systems which monitor and report on various accounts associated with the user. For example, the gaming establishment fund management system that maintains the enterprise wallet is in communication with one or more credit reporting and risk systems. These credit reporting and risk systems monitor and report on a credit rating and status of one or more accounts maintained for the user at various funding sources, such as various financial institutions. It should be appreciated that while illustrated as the gaming establishment fund management system being in communication with one or more credit reporting networks and one or more credit reporting/credit risk systems, in different embodiments, any component or sub-system of the present disclosure can be in communication with one or more credit reporting/credit risk systems.

In certain embodiments, the system utilizes one mobile device application to interact with the different components of the gaming establishment fund management system to, amongst other actions, access funds maintained in the different gaming establishment accounts associated with the user. For example, utilizing the same mobile application, a mobile device interacts with both the first cashless wagering system of the gaming establishment fund management system and the gaming establishment retail wallet system of the gaming establishment fund management system. In certain embodiments, the system utilizes multiple mobile device applications to interact with the different components of the gaming establishment fund management system to, amongst other actions, access funds maintained in the different gaming establishment accounts associated with the user. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a QR code).

It should be appreciated that in different embodiments, in addition to or alternatively from utilizing a mobile device running a mobile device application to, amongst other actions, access funds associated with different gaming establishment accounts, the system utilizes a kiosk, an EGM, a service window displayed by a gaming device (e.g., a remote host controlled service window displayed by an EGM), a display device/input device associated with a seat-level gaming table component, a display device/input device associated with a table-level gaming table component, a display device/input device associated with a mobile gaming table component, a component of a gaming establishment patron management system, such as a player tracking unit, a retail point-of-sale terminal, and/or a gaming establishment interface, such as a casino desk, to, amongst other actions, access the funds associated with such gaming establishment accounts. It should be further appreciated that while illustrated in FIG. 1 as using a mobile device running a mobile device application to access funds associated with different gaming establishment accounts (e.g., a cashless wagering account and a gaming establishment retail account), as mentioned above, a physical instrument, such as a smart card or a user issued magnetic striped card may additionally or alternatively be utilized to enable a user access to such gaming establishment account.

In various embodiments, prior to enabling a user to purchase goods and/or services and provide tips with funds in a gaming establishment retail account, a user must first open a gaming establishment retail account with a gaming establishment retail wallet system. In these embodiments, utilizing an interface, such as a mobile device application being executed by a mobile device, a website accessed from a browser and/or a service window displayed by EGM (or other gaming device), the user attempts to open a gaming establishment retail account through one or more interactive forms. For example, as part of opening a gaming establishment retail account, a user (whom has already logged into one or more gaming establishment fund management system accounts via a mobile device application) makes one or more inputs via an interface to provide certain user identifying information, such as, but not limited to, additional address details, a social security number and/or a mother's maiden name, and/or certain anticipated spending information, such as how the user intends to spend the funds withdrawn from such an account if opened.

In one such embodiment, in association with the opening of the account, the user is provided a physical instrument associated with the gaming establishment patron management system account and/or the gaming establishment account. In another such embodiment, the user is provided a code to activate their account and/or download a mobile identification (e.g., a mobile pass representing a player tracking card) via logging into a mobile device application associated with the gaming establishment or logging into a website associated with the gaming establishment. In another such embodiment, the user is sent a short message service ("SMS") text and/or e-mail informing the user how to activate their account and/or download a mobile identification via logging into a mobile device application associated with the gaming establishment or logging into a website associated with the gaming establishment. In certain embodiments, the system enables a user, such as a retail patron, to enroll or otherwise sign up for such accounts via other avenues, such as via picking up a retail account card at various locations, such as shops, throughout the gaming establishment, via a mobile application running on a mobile device, via a point-of-sale terminal, via an EGM, via a kiosk and/or via adding a retail account to an existing patron account, such as a player tracking account. In another embodiment, the system automatically creates a gaming establishment retail account for a user who is otherwise associated with another gaming establishment account, such as a cashless wagering account.

In certain embodiments, as part of an opening a gaming establishment retail account or in association with a previously opened gaming establishment retail account, the gaming establishment fund management system determines zero, one or more security measures to invoke in association with each transaction that uses funds from a user's gaming establishment retail account. In these embodiments, to prevent unauthorized access to the funds associated with the user's gaming establishment retail account, the system applies such determined security measures in association with any transaction, such as any tipping, that attempts to use funds from the user's gaming establishment retail account (and/or funds from zero, one or more other accounts maintained in association with the user).

In certain embodiments, as part of an opening a gaming establishment retail account or in association with a previously opened gaming establishment retail account, the gaming establishment fund management system determines one or more controls or restrictions, such as tipping controls, to associate with the gaming establishment retail account wherein if such conditions are satisfied, the gaming establishment fund management system denies the transaction or invokes one or more security measures. In these embodiments, to balance the need to prevent unauthorized access to the funds associated with the user's gaming establishment retail account against the need to provide a frictionless experience for users, the gaming establishment fund management system dynamically employs one or more controls such that certain transactions trigger the need to potentially employ enhanced security measures and certain transactions do not trigger the need to potentially employ enhanced security measures.

In certain embodiments, the system enables a gaming establishment operator to determine and activate zero, one or more tipping controls to associate with a gaming establishment retail account as well as zero, one or more security measures to employ. In these embodiments, if any gaming establishment operator determined tipping controls are violated, the system attempts to prevent unauthorized access to the funds associated with a user's gaming establishment retail account. In certain embodiments, the determination to associate one or more tipping controls and/or security measures is based on one or more inputs from a gaming establishment operator wherein gaming establishment personnel indicate that they would like one or more tipping controls and/or security measures associated with certain of (or each of) the purchases made using funds from a user's gaming establishment retail account.

In certain embodiments, the system enables a retail point-of-sale system to determine and activate one or more tipping controls and/or security measures to associate with transactions undertaken by the retail point-of-sale system. In certain of these embodiments, the determination to associate one or more tipping controls and/or security measures is based on one or more inputs from gaming establishment retail personnel whom indicate that they would like one or more tipping controls and/or security measures associated with certain of (or each of) the purchases made in association with the retail point-of-sale system. In certain other of these embodiments, the determination to associate one or more tipping controls and/or security measures is based on one or more settings associated with the gaming establishment retail point-of-sale system that dictate one or more tipping controls and/or security measures associated with certain of (or each of) the purchases made in association with the retail point-of-sale system. In certain embodiments, one or more determinations are made at the retail point-of-sale terminal level wherein different terminals are associated with different tipping controls and/or security measures. In certain embodiments, one or more determinations are made at the retail point-of-sale system level wherein each terminal is associated with the same tipping controls and/or security measures (which, as described below, may vary based on one or more attributes of the attempted transaction).

In certain embodiments, the system enables the user to determine and activate zero, one or more tipping controls to associate with the gaming establishment retail account as well as zero, one or more security measures to employ. In these embodiments, if any user determined tipping controls are violated, the system attempts to prevent unauthorized access to the funds associated with the user's gaming establishment retail account. In certain embodiments, the determination to associate one or more tipping controls and/or security measures is based on one or more inputs from the user wherein the user indicates that they would like one or more tipping controls and/or security measures associated with certain of (or each of) the purchases made using funds from their gaming establishment retail account.

In certain embodiments, the tipping controls are associated with an identity of whom may create a tipping transaction associated with a user's purchase transaction. In the embodiments wherein a purchase transaction and a tip transaction are separate transactions that are linked via a common transaction identifier, since the tip transaction occurs after a settlement of the purchase transaction, the system employs tipping controls that specify whom may initiate the tip transaction (and/or who may not initiate the tip transaction). For example, the system employs tipping controls that provide that authorized gaming establishment personnel are permitted to initiate a tip transaction associated with a settled purchase transaction, but unauthorized gaming establishment personnel (and/or other persons beyond the user) are not permitted to initiate a tip transaction associated with a settled purchase transaction.

In certain embodiments, the tipping controls are additionally or alternatively associated with the amount of the retail purchase and/or the amount of the tip attempted to be made. In these embodiments, certain retail purchases and/or tips having a value above a threshold value that trigger the use of one or more tipping controls while other retail purchases or tips that have a value below the threshold value do not trigger such tipping controls. In the embodiments wherein a purchase transaction and a tip transaction are separate transactions that are linked via a common transaction identifier, since the tip transaction occurs after a settlement of the purchase transaction, the system employs tipping controls that specify that the amount of the tip must be within a predetermined percentage range of the amount of the purchase transaction. For example, tips can be made using funds from a gaming establishment retail account if such tips are less than 30% of the purchase price, while tips of more than 30% of the purchase price are either denied or trigger one or more enhanced security measures that must be satisfied before the completion of such tips with funds from a gaming establishment retail account.

In certain embodiments, the tipping controls are additionally or alternatively associated with the type of good and/or service of the retail purchase attempted to be made. In these embodiments, certain types of retail purchases trigger the use of one or more tipping controls while other types of retail purchases do not trigger such tipping controls. For example, a first category of purchases, such as food and beverage purchases, can be made using funds from a gaming establishment retail account without triggering any tipping controls while a second category of purchases, such as clothing retail outlets and entertainment related charges, trigger one or more tipping controls that must be satisfied before the completion of such purchases with funds from a gaming establishment retail account.

In certain embodiments, the tipping controls are additionally or alternatively associated with a location of the retail purchase attempted to be made. In these embodiments, different locations where the funds from the gaming establishment retail account may be used are associated with different tipping controls required to use such funds. For example, tips attempted in association with a first location, such as a gaming establishment gift shop, do not trigger the use of one or more tipping controls while tips attempted in association with a second location, such as a gaming establishment night club, trigger one or more tipping controls.

In certain embodiments, the tipping controls are additionally or alternatively associated with a channel of commerce in which the retail purchase or tip is attempted to be made. In these embodiments, different channels of commerce where the funds from the gaming establishment retail account may be used are associated with different tipping controls required to use such funds. In certain embodiments, the tipping controls are additionally or alternatively associated with a time of when the retail purchase or tip is attempted to be made. In certain embodiments, the tipping controls are additionally or alternatively associated with an amount of funds currently maintained in a gaming establishment retail account associated with a user. In certain embodiments, the tipping controls are additionally or alternatively associated with a current rate of consumption of the funds in one or more gaming establishment accounts maintained for the user. In one such embodiment, the rate of consumption is based on an amount of purchases or tips made using funds from a gaming establishment retail account over a set period of time, such as the current day. In another such embodiment, the rate of consumption is based on an amount of purchases or tips made using funds from a gaming establishment retail account over a rolling period of time, such as the past 24 hours.

It should be appreciated that in different embodiments, the system employs a combination of these tipping controls to determine whether or not the tipping is permitted and/or any security measures need to be activated. For example, tipping controls are based on whether a total amount of retail purchases and/or tips made at a designated location on certain type of goods and/or services using funds from a gaming establishment retail account are over a designated period of time. In this example, if the total amount of retail purchases and/or tips made at the designated location on the identified type of goods and/or services using funds from the gaming establishment retail account over the designated period of time meet or exceed a threshold, then the system denies the authorization of subsequent tips and/or employs one or more enhanced security features.

In certain embodiments, the system employs the same tipping controls and/or security measures for each user whom attempts to purchase goods and/or services and/or make tips with funds from a gaming establishment retail account. In certain embodiments, the system employs different tipping controls and/or security measures for different users whom attempt to purchase goods and/or services and/or make tips with funds from a gaming establishment retail account. In certain of these embodiments, the system utilizes historical data regarding the user and past gaming establishment retail transactions in determining one or more aspects of one or more tipping controls and/or security measures to associate with that user. In certain of these embodiments, the system utilizes one or more attributes of the user, such as a player tracking account status of the user, in determining one or more aspects of one or more tipping controls and/or security measures to associate with that user.

Following the gaming establishment fund management system and/or the gaming establishment retail system determines to authorize the user to make retail purchases subject to zero, one or more applicable controls and/or enhanced security measures, then following any required acknowledgement by the user of any required terms and conditions associated with using a gaming establishment retail account to purchase goods and/or services associated with the gaming establishment and/or provide any tips in association with such purchased goods and/or services, the gaming establishment fund management system and/or the gaming establishment retail system notifies the user, if applicable, regarding the different ways the user may pay for retail purchases (and provide any corresponding tips) utilizing funding options provided by the gaming establishment fund management system. For example, the gaming establishment fund management system and/or the gaming establishment retail system notifies the user, via one or more of a message displayed on a displayed message at a gaming establishment device (e.g., an EGM or a retail point-of-sale terminal), an email, a SMS or text message, and/or a notification displayed by a mobile device application.

In certain embodiments, to facilitate the transfer of funds from a gaming establishment retail account to an account associated with a retailer to purchase goods and/or services from the retailer as well as provide one or more tips in association with such purchases, the user presents a retail wallet identity (e.g., a physical card associated with the gaming establishment retail account, a mobile device running a mobile device application associated with the gaming establishment retail account, or a mobile device that presents an identity associated with the user or the user's gaming establishment retail account) to potentially access the funds in the gaming establishment retail account for the purchase transaction and tip transaction. In these embodiments, upon the presentation of the retail wallet identity at an applicable point-of-sale terminal of a retail point-of-sale system within or otherwise associated with the gaming establishment for the purchase of goods and/or services, the system determines whether or not to complete the attempted retail purchase. For example, when a purchase of goods and/or services is attempted to be made with funds from a gaming establishment retail account using a mobile device application at a point-of-sale terminal, the mobile device application prompts the user to cause the mobile device to engage the point-of-sale terminal, such as prompting the user to tap the mobile device to a designated portion of the point-of-sale terminal (or otherwise moving the mobile device to within a designated distance of a designated location of the point-of-sale terminal). Such engagement initiates a pairing or linkage between the mobile device and the point-of-sale terminal (or a component of a gaming establishment fund management system located inside the point-of-sale terminal (i.e., a component of the point-of-sale terminal)), wherein the pairing or linkage between the mobile device and the point-of-sale terminal occurs via one or more applications being run or executed on the mobile device. In this example, after such engagement, the mobile device application communicates, via a wireless communication protocol (including, but not limited to: Bluetooth™, Bluetooth™ Low Energy ("BLE"), one or more cellular communication standards (e.g., 3G, 4G, 5G, 6G, LTE), one or more Wi-Fi compatible standards, and one or more short range communication protocols (e.g., a near field communication ("NFC") protocol), data associated with the retail wallet identity to the point-of-sale terminal to facilitate the potential purchase of goods and/or services and/or the potential tip. In various embodiments, in addition to or alternative from attempting to make purchases of goods and/or services and/or provide tips with funds in a gaming establishment retail account at a point-of-sale terminal, the system of the present disclosure enables a user to attempt to make purchases of goods and/or services and/or provide tips with funds in a gaming establishment retail account via any suitable interface, such as a user interface of an EGM, a user interface of a gaming table component associated with a gaming table, a kiosk, a mobile device application being executed by a mobile device, a service window displayed by a gaming device (e.g., a remote host controlled service window displayed by an EGM), and/or a gaming establishment interface (e.g., a casino desk).

In various embodiments wherein the purchase transaction and the tip transaction are separate, but linked, transactions, the system of the present disclosure first completes the purchase transaction and then completes the tip transaction wherein one or more stored identifiers link these two transactions together. In these embodiments, upon receiving data or information regarding the retail wallet identity, the retail point-of-sale system communicates with the gaming establishment retail system (and/or the gaming establishment fund management system) to determine if the gaming establishment retail account has adequate funds for the intended purchase. If the gaming establishment retail wallet system (and/or the gaming establishment fund management system) indicates that the gaming establishment retail account lacks adequate funds for the purchase, the retail point-of-sale system (and/or the gaming establishment fund management system) denies this sale transaction of the goods and/or services using the gaming establishment retail account. Such a denial of the sale transaction of the goods and/or services using the gaming establishment retail account forgoes any tip transaction.

On the other hand, if the gaming establishment retail wallet system (and/or the gaming establishment fund management system) confirms the presence of adequate funds in the gaming establishment retail account, the retail point-of-sale system (and/or the gaming establishment fund management system) authorizes the sale of the goods and/or services. The gaming establishment retail wallet system (and/or the gaming establishment fund management system) then proceeds to transfer an amount of funds to cover the purchased goods and/or services from the gaming establishment retail account to an account associated with the retail point-of-sale system (and/or the retail establishment) to complete the purchase of the goods and/or services. Such a transfer of funds to complete the purchase of the goods and/or services is associated with a transaction identification which one or more components of the system store for reporting purposes.

In these embodiments wherein the purchase transaction and the tip transaction are separate, but linked, transactions, in addition to completing the purchase of the goods and/or services, the retail point-of-sale system enables the user to provide a tip associated with the purchase of the goods and/or services. In certain such embodiments, the retail point-of-sale system enables the user to provide a tip as part of the purchase of the goods and/or services such that data associated with the amount of the potential tip is received prior to any determination of whether or not to complete the attempted retail purchase. In certain other embodiments, the retail point-of-sale system enables the user to provide a tip subsequent to the completed purchase of the goods and/or services such that data associated with the amount of the potential tip is received after any determination to complete the attempted retail purchase.

Figure 2B:
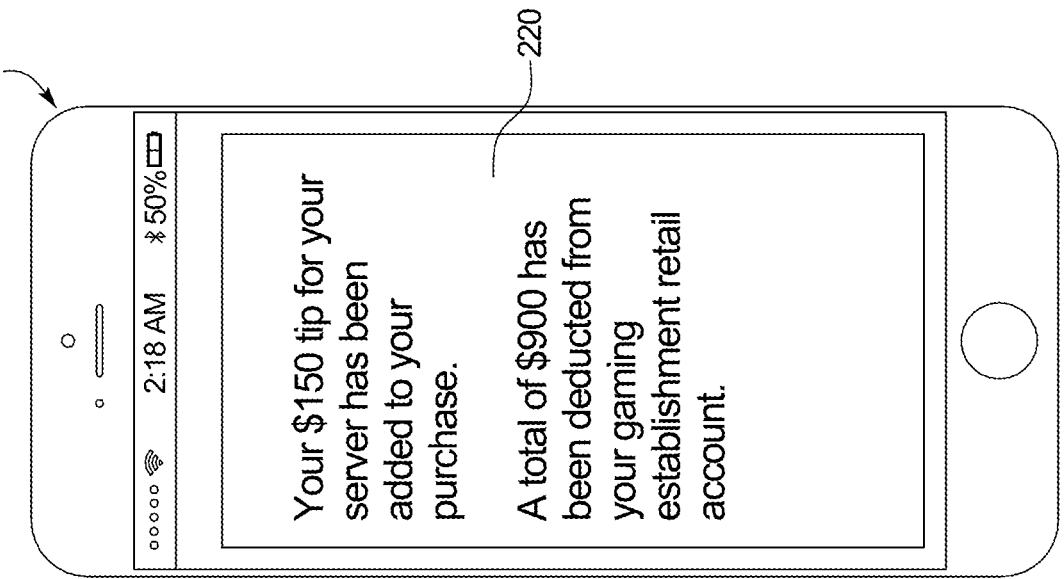
FIGS. 2A and 2B are example graphical user interfaces displayed in connection with providing a tip in association with a purchase of goods and/or services using funds from a gaming establishment retail account.
Figure 2A:
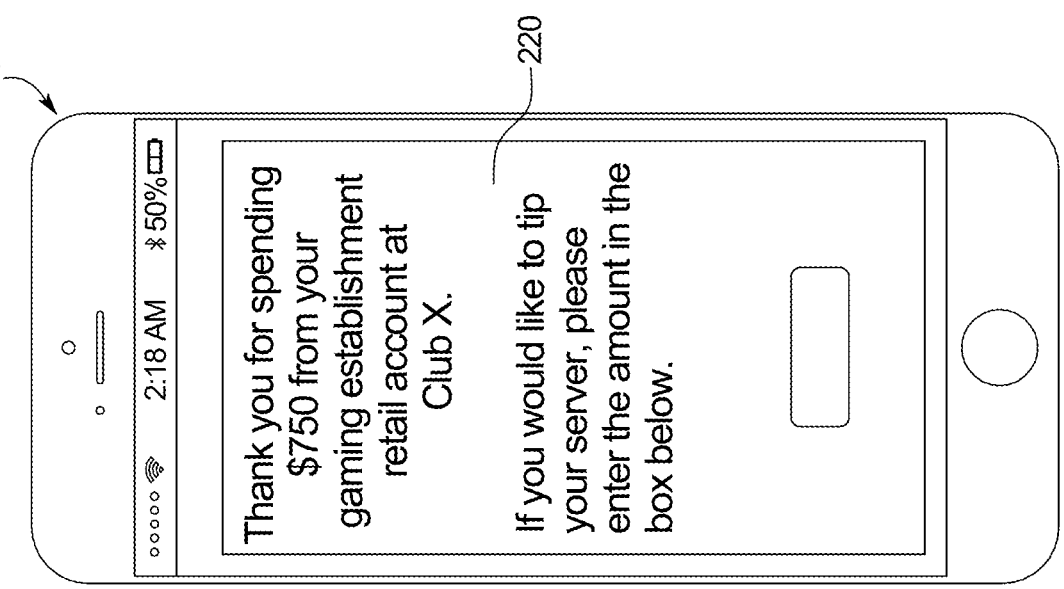

In certain embodiments, the retail point-of-sale system enables the user to make one or more inputs to designate a tip to be provided to the personnel that facilitated the completion of the purchase of the goods and/or services using the same interface used in association with the purchase of the goods. For example, if, in association with the completed purchase, the user engaged with a point-of-sale terminal to facilitate the access of funds in a gaming establishment account, the system enables the user to further engage the point-of-sale terminal to enter a tip to be provided in association with the completed purchase. In certain embodiments, the system enables the user to make one or more inputs to designate a tip to be provided to the personnel that facilitated the completion of the purchase of the goods and/or services using a different interface. For example, as seen in FIG. 2A, if, in association with the completed purchase, the user engaged with a point-of-sale terminal to facilitate the access of funds in a gaming establishment account, the system enables the user to engage a mobile device 210 executing a mobile device application 220 to enter a tip to be provided in association with the completed purchase. In different embodiments, the one or more inputs designate an amount of a tip (e.g., a tip of $5.00) and/or a percentage of the purchase price of the goods and/or services (e.g., a tip of 20% of the purchase amount) that equates to a determined amount of the tip.

In various embodiments, following the receipt of one or more inputs indicating a tip to be provided, various components of the system operate together to approve or deny the requested tip amount. For example, after a user makes one or more inputs using a mobile device application at a point-of-sale terminal to indicate a tip amount attempted to be made with funds from a gaming establishment retail account and to the extent an engagement with the point-of-sale is needed (e.g., a prior engagement from the purchase transaction has timed out), the mobile device application prompts the user to cause the mobile device to engage the point-of-sale terminal to initiate a pairing or linkage between the mobile device and the point-of-sale terminal (or a component of a gaming establishment fund management system located inside the point-of-sale terminal (i.e., a component of the point-of-sale terminal)). In this example, after such engagement, the mobile device application communicates, via a wireless communication protocol, data associated with one or more of the retail wallet identity, and the amount of the added tip to the point-of-sale terminal of the retail point-of-sale system to facilitate the potential tip transaction. In these embodiments, upon receiving data or information regarding the attempted tip to be made, the retail point-of-sale system communicates data to the gaming establishment retail system (and/or the gaming establishment fund management system) to determine whether or not to complete the attempted tip transaction. To ensure that the potential tip transaction is stored in association with the completed purchase transaction, this communication includes not only the amount of the intended tip, but also the transaction identification associated with the completed purchase of the goods and/or services In certain embodiments, the determination of whether to complete the attempted trip transaction is based on whether the requested tip complies with any tipping controls associated with the tip transaction. In these embodiments, if a determination occurs that the requested tip transaction violates any applicable tipping controls, the gaming establishment retail wallet system (and/or the gaming establishment fund management system) denies the tip transaction. For example, if a tipping control associated with an identity of whom may create a tipping transaction associated with a user's original purchase transaction is currently in place and the system determines that the tip is attempted to be created by an unauthorized party, the tipping control prevents the tip transaction from being completed regardless of whether or not the amount of funds currently associated with the gaming establishment retail account is adequate to cover the amount of the tip requested. In another example, if a tipping control associated with the amount of the tip attempted to be made is currently in place and the system determines that the amount of the tip exceeds a threshold value (as an amount and/or as a percentage of the purchase amount of the good and/or service) the tipping control prevents the tip transaction from being completed regardless of whether or not the amount of funds currently associated with the gaming establishment retail account is adequate to cover the amount of the tip.

Figure 3A:
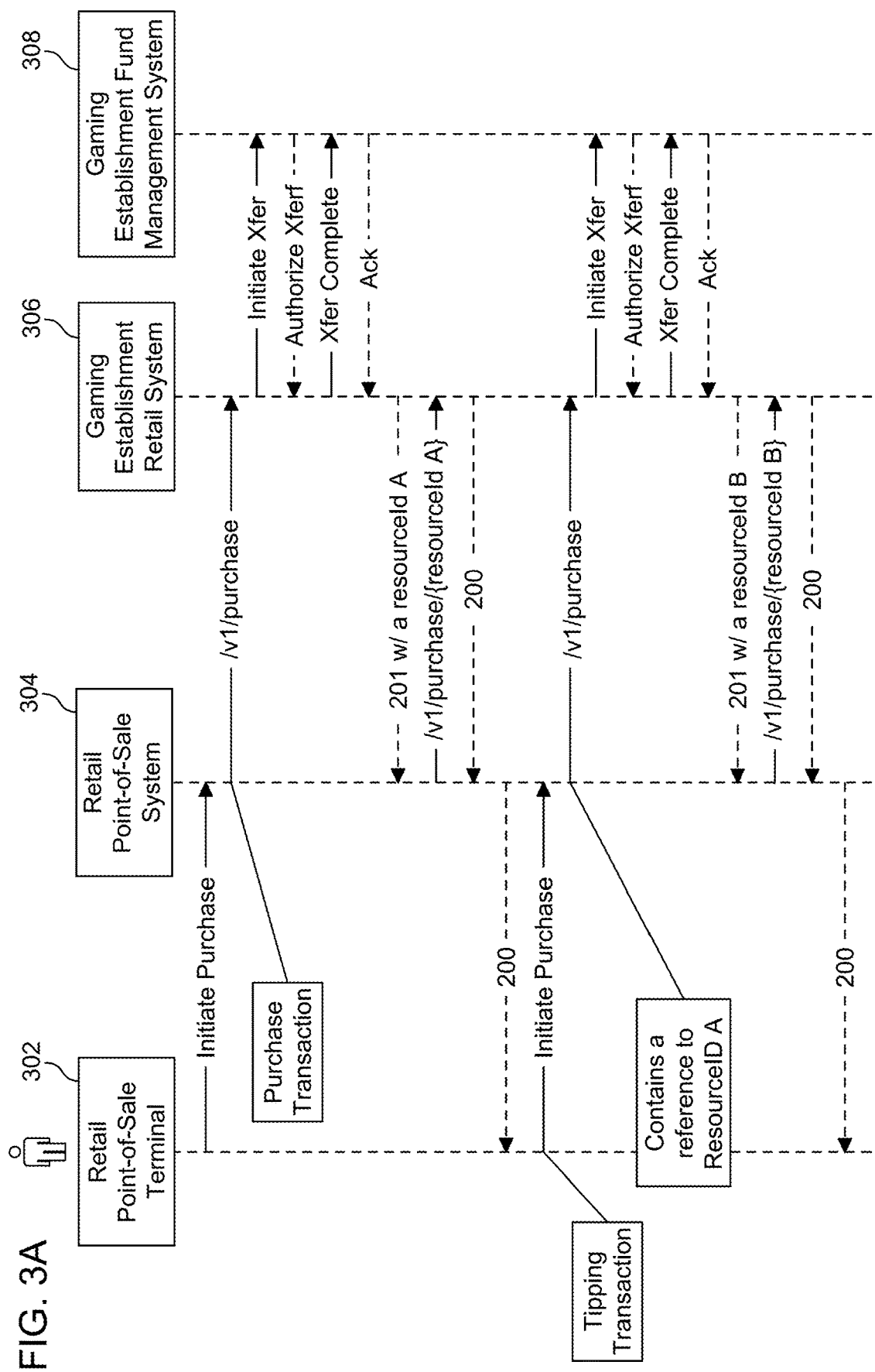
FIGS. 3A and 3B are flow charts of example processes for operating a system which enables providing a tip in association with a purchase of goods and/or services using funds from a gaming establishment retail account.

If a determination occurs that the requested tip transaction complies with any applicable tipping controls, the gaming establishment retail wallet system (and/or the gaming establishment fund management system) proceeds with the determination of whether or not to authorize the tip transaction based on the amount of funds currently associated with the gaming establishment retail account. If the gaming establishment retail wallet system (and/or the gaming establishment fund management system) indicates that the gaming establishment retail account lacks adequate funds for the intended tip, the retail point-of-sale system (and/or the gaming establishment fund management system) denies this tip transaction using any funds from the gaming establishment retail account. On the other hand, if the gaming establishment retail wallet system (and/or the gaming establishment fund management system) confirms the presence of adequate funds in the gaming establishment retail account, the retail point-of-sale system (and/or the gaming establishment fund management system) authorizes the amount of the tip. The gaming establishment retail wallet system (and/or the gaming establishment fund management system) then proceeds to transfer an amount of funds to cover the intended tip from the gaming establishment retail account to an account associated with the retail point-of-sale system (and/or the retail establishment) to complete the tip transaction. Accordingly, as seen in the example of FIG. 3A, a plurality of different components of the system of the present disclosure (i.e., a retail point-of-sale terminal 302, a retail point-of-sale system 304, a gaming establishment retail system 306, and a gaming establishment fund management system 308) interact with each other to potentially enable a user to purchase goods and/or services and additionally make a tip in association with such a purchase using an amount of funds in a gaming establishment retail account. As further seen in this example, to account for the timing restrictions and/or authorization amount restrictions associated with the use of funds drawn from gaming establishment accounts, these different components of the system interact with each other to provide that the tip transaction occurs following a completion of the purchase transaction with both transactions linked together (via a transaction identifier) such that the user is presented these two separate transactions as a single transaction.

In certain embodiments wherein the purchase transaction and tip transaction are handled by the gaming establishment fund management system as a single transaction of the purchase amount plus the tip amount, upon the presentation of a retail wallet identity at an applicable point-of-sale terminal of a retail point-of-sale system within or otherwise associated with the gaming establishment for the purchase of goods and/or services and further upon the indication of an amount of tip to associate with the purchase of goods and/or services, various components of the system operate together to approve or deny the attempted retail purchase plus the requested tip amount. For example, when a purchase of goods and/or services plus an added tip amount is attempted to be made with funds from a gaming establishment retail account using a mobile device application at a point-of-sale terminal, the mobile device application prompts the user to cause the mobile device to engage the point-of-sale terminal to initiate a pairing or linkage between the mobile device and the point-of-sale terminal (or a component of a gaming establishment fund management system located inside the point-of-sale terminal (i.e., a component of the point-of-sale terminal)). In this example, after such engagement, the mobile device application communicates, via a wireless communication protocol, data associated with the retail wallet identity, the amount of the attempted purchase and the amount of the added tip to the point-of-sale terminal to facilitate the potential purchase of goods and/or services plus the added tip.

In these embodiments, upon receiving data or information regarding the retail wallet identity, the amount of the attempted purchase and the amount of the added tip, the retail point-of-sale system communicates such data to the gaming establishment retail system (and/or the gaming establishment fund management system) to determine whether or not to complete the attempted retail purchase plus the requested tip amount. In certain such embodiments, if data associated with the purchase transaction is received prior to data associated with the tip transaction, the system holds the processing of the purchase transaction until the data associated with the tip transaction is received. Such a configuration provides that even if a tip transaction is broken out from a purchase transaction, the system will process such separate transactions together as a single transaction.

In various embodiments, the determination of whether or not to complete the attempted retail purchase plus the requested tip amount is based on whether or not an amount of funds currently associated with a gaming establishment retail account is adequate to cover the amount of the retail purchase plus the tip amount requested to be provided. Specifically, in these embodiments, the gaming establishment retail wallet system (and/or the gaming establishment fund management system) determines whether or not to authorize the transaction based on the amount of funds currently associated with the gaming establishment retail account relative to the amount of funds requested to cover the retail purchase plus the tip amount requested to be provided. If the gaming establishment retail wallet system (and/or the gaming establishment fund management system) indicates that the gaming establishment retail account lacks adequate funds for the purchase and/or the added tip, the retail point-of-sale system (and/or the gaming establishment fund management system) denies this sale transaction of the goods and/or services using the gaming establishment retail account.

Figure 3B:
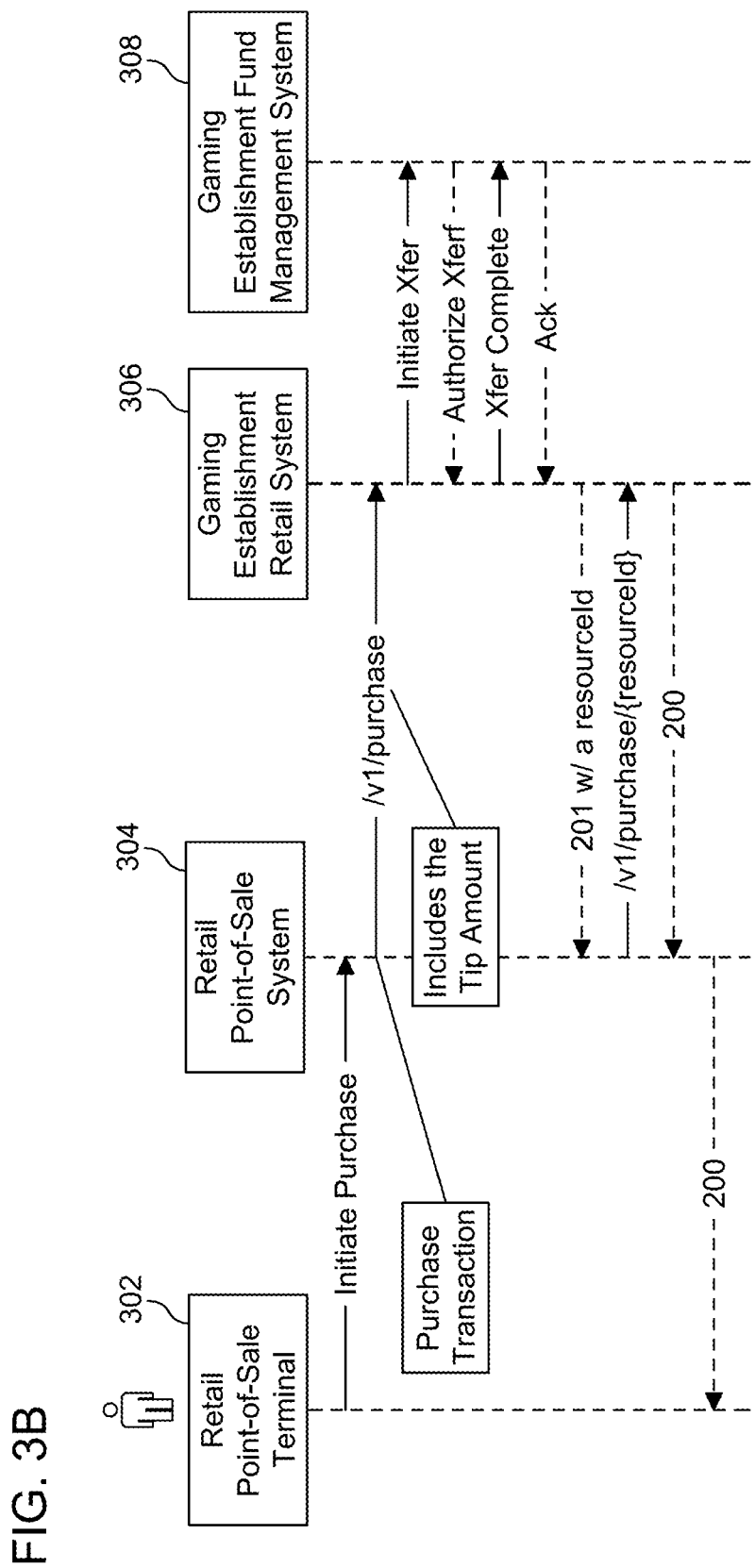

On the other hand, if the gaming establishment retail wallet system (and/or the gaming establishment fund management system) confirms the presence of adequate funds in the gaming establishment retail account, the retail point-of-sale system (and/or the gaming establishment fund management system) authorizes the sale of the goods and/or services plus the added tip. In this instant, the gaming establishment retail wallet system (and/or the gaming establishment fund management system) proceeds to transfer an amount of funds to cover the purchased goods and/or services plus the added tip from the gaming establishment retail account to an account associated with the retail point-of-sale system (and/or the retail establishment) to complete the purchase of the goods and/or services plus the added tip. Such a transfer of funds to complete the purchase of the goods and/or services coupled with an added tip amount is associated with a transaction identification which one or more components of the system store for reporting purposes. Accordingly, as seen in the example of FIG. 3B, a plurality of different components of the system of the present disclosure (i.e., a retail point-of-sale terminal 302, a retail point-of-sale system 304, a gaming establishment retail system 306, and a gaming establishment fund management system 308) interact with each other to potentially enable a user to purchase goods and/or services and provide a tip in association with such a purchase using an amount of funds in a gaming establishment retail account wherein the tip transaction occurs concurrently with the purchase transaction.

In certain embodiments, following the completion of the original purchase with funds associated with a gaming establishment retail account, following the completion of a tip transaction (either as a separate transaction linked to the original purchase transaction or as part of the original purchase transaction) and/or following a determination that a purchase with funds associated with a gaming establishment retail account cannot be completed, the system notifies the user via one or more employed interfaces. In one such embodiment wherein the user employed a mobile device paired with a point-of-sale terminal in association with the transaction, the point-of-sale terminal and/or the mobile device provide such a notification to the user, such as the point-of-sale terminal printing a receipt of a completed transaction or a mobile device application displaying a message regarding the transaction. For example, as seen in FIG. 2B, even when a purchase transaction and a tip transaction must be executed as separate transactions that are settled sequentially by the gaming establishment retail wallet system (and/or the gaming establishment fund management system), the employment of a common transaction identifier for both transactions enables the two separate transactions to be conveyed to the user as a single transaction, such as via a mobile device 210 executing a mobile device application 220 to inform the user of the total amount of the purchase formed from the purchase amount and the added tip amount. In another such embodiment, the system notifies the user via a secondary communication channel, such as via sending an email, SMS, and/or mobile device application notification, regarding the transaction(s).

Accordingly, in view of the recognized constraints of how gaming establishment accounts process transactions, the system of the present disclosure enables tipping transactions to occur while staying withing the confines of such constraints. That is, given the specific timing restrictions and/or authorized amount restrictions that gaming establishment accounts utilize in the settlement of funds drawn from such gaming establishment accounts, the present disclosure enables one or more tips to be made in association with a purchase of goods and/or services with funds drawn from such gaming establishment accounts while remaining in compliance with such specific time restrictions and/or authorized amount restrictions. Such a configuration of enabling both purchases of goods and/or services and the accompanying tips using funds in one or more gaming establishment accounts overcomes various security concerns associated with cash-based retail transactions (e.g., protecting patrons carrying cash to retail establishments) and encourages patrons to participate in an alternative, non-cash-based option for the patron to purchase goods and/or services from a retail establishment, thereby expanding the cashless ecosystem certain gaming establishments strive for.

In various embodiments, prior to using funds in a gaming establishment retail account to purchase goods and/or services and/or provide any tips to personnel associated with the purchase of such goods and/or services, the system enables the gaming establishment retail account to be funded from one or more sources. In certain embodiments, the system enables the gaming establishment retail account to be directly funded from one or more of such sources. In certain embodiments, the system enables the gaming establishment retail account to be indirectly funded from one or more of such sources, such as by an amount of funds from such sources first being transferred to another gaming establishment account and then such an amount of funds being transferred from the other gaming establishment account to the gaming establishment retail account.

In certain embodiments, the gaming establishment fund management account is associated with one or more external accounts, such as one or more credit card accounts, one or more debit card accounts and/or one or more third-party maintained accounts (e.g., one or more PayPal® accounts or Venmo® accounts). In certain embodiments, the gaming establishment fund management account is associated with a gaming establishment or a group of gaming establishments, wherein the user establishes a gaming establishment fund management account, such as a gaming establishment retail account, by a deposit of funds (such as at a kiosk) to be subsequently utilized in association with the mobile device application. In other embodiments, the gaming establishment fund management account, such as a gaming establishment retail account, is funded via a mobile device electronic fund transfer, such using Apple Pay™ or Android Pay™. It should be appreciated that in different embodiments, the system utilizes a mobile device running a mobile device application, a kiosk, an EGM, a gaming table component, a service window displayed by a gaming device (e.g., a remote host controlled service window displayed by an EGM) and/or a gaming establishment interface to facilitate the transfer of funds from a third-party account. In certain embodiments, the system enables funds to be deposited in a gaming establishment fund management account, such as a gaming establishment retail account, via activating a line of credit or marker associated with the user.

In certain embodiments, the system enables funds to be deposited in a gaming establishment fund management account, such as a gaming establishment retail account, via a gaming device, such as an EGM. In certain embodiments, the system enables a user that has an amount of cash to utilize a gaming device to convert the cash to an amount deposited into a gaming establishment fund management account (which may be subsequently transferred utilizing a mobile device application). In other embodiments, the system enables funds to be deposited in a gaming establishment fund management account via a gaming device that accepts printed ticket vouchers. In these embodiments, the system enables a user that has one or more printed ticket vouchers to utilize a gaming device to convert the printed ticket voucher to an amount deposited into a gaming establishment fund management account (which may be subsequently transferred utilizing a mobile device application).

In certain embodiments, the system enables funds to be deposited in a gaming establishment fund management account, such as a gaming establishment retail account, via a gaming establishment interface, such as a gaming establishment cage or desk. In certain embodiments, the system enables a user that has an amount of cash to utilize a gaming establishment interface, such as a gaming establishment cage or desk to convert the cash to an amount deposited into a gaming establishment fund management account (which may be subsequently transferred utilizing a mobile device application). In other embodiments, the system enables funds to be deposited in a gaming establishment fund management account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment fund management account (which may be subsequently transferred utilizing a mobile device application).

In certain embodiments, the system enables funds to be deposited in a gaming establishment fund management account, such as a gaming establishment retail account, via a kiosk that accepts money. In certain embodiments, the system enables a user that has an amount of cash to utilize a kiosk to convert the cash to an amount deposited into a gaming establishment fund management account (which may be subsequently transferred to a gaming device utilizing a mobile device application). In other embodiments, the system enables funds to be deposited in a gaming establishment fund management account via a kiosk that accepts printed ticket vouchers. In certain embodiments, the system enables a user that has one or more printed ticket vouchers to utilize a kiosk to convert the printed ticket voucher to an amount deposited into a gaming establishment fund management account (which may be subsequently transferred to a gaming device utilizing a mobile device application).

In certain embodiments, the gaming establishment fund management account, such as a gaming establishment retail account, is associated with funds associated with one or more virtual ticket vouchers. In certain embodiments, the system enables a user associated with an amount of virtual ticket vouchers to utilize a gaming device (e.g., an EGM, a component of an EGM) a mobile device running a mobile device application, a kiosk and/or a gaming establishment interface to convert the virtual ticket vouchers to an amount deposited into a gaming establishment fund management account.

In certain embodiments, the system enables a user to fund the gaming establishment fund management account, such as a gaming establishment retail account, independent of the mobile device and independent of the mobile device application. In certain other embodiments, the system enables a user to utilize a mobile device running a mobile device application to fund the gaming establishment fund management account. More specifically and utilizing the example of a kiosk, in one embodiment, to utilize a mobile device and a kiosk to facilitate the funding of a gaming establishment fund management account, the user wirelessly pairs or otherwise connects a mobile device with a kiosk. In one example embodiment, the user moves the mobile device into the range of a wireless receiver of the kiosk. The kiosk and the launched or activated mobile device application of the mobile device negotiate a secure, authenticated connection with the proper functionality, versions and security settings. It should be appreciated that the kiosk wirelessly connects with the mobile device running the mobile device application in the same or similar fashion to how a mobile device is paired or connected with a gaming device of the present disclosure. After connecting the mobile device to the kiosk, the kiosk prompts the user to deposit an amount of funds into the kiosk. In one such embodiment, the kiosk prompts the user to insert one or more bills into a bill acceptor of the kiosk. In another such embodiment, the kiosk additionally or alternatively prompts the user to deposit a physical ticket voucher (associated with an amount of funds) into the kiosk. In another such embodiment, the kiosk additionally or alternatively prompts the user to deposit a card associated with an external account, such as a credit card or debit card into the kiosk. In another such embodiment, the kiosk additionally or alternatively prompts the user to enter information associated with an external account, such as a credit card account, a PayPal® account, a Venmo® account, or a debit card account into the kiosk. In another such embodiment, the kiosk additionally or alternatively prompts the user to deposit an amount of funds into the kiosk using a mobile device electronic fund transfer, such using Apple Pay™ or Android Pay™.

In certain embodiments, upon receiving an amount of funds from the user and the user indicating to transfer the deposited amount of funds in association with the mobile device application, the kiosk communicates with one or more servers to transfer an amount of money to a gaming establishment fund management account (to be drawn upon from the mobile device application of the present disclosure). In another such embodiment, upon receiving an amount of funds from the user and the user indicating to transfer the deposited amount of funds in association with an account or balance associated with the mobile device application, the kiosk communicates with one or more servers, such as a virtual ticket voucher server, to create a virtual ticket voucher associated with the amount of received currency. The system of the present disclosure transfers the created virtual ticket voucher to the gaming establishment fund management account.

It should be appreciated that the electronic fund data transfers of the present disclosure may occur in addition to or as an alternative from cash-based fund transfers and/or ticket voucher-based fund transfers. In one such embodiment, an amount of funds transferred to a gaming establishment device (e.g., an EGM or a retail point-of-sale terminal) is funded via any of an electronic fund transfer, a cash-based fund transfer or a ticket voucher-based fund transfer. In another embodiment, an amount of funds transferred from a gaming establishment device (e.g., an EGM or a gaming table component) is cashed out via any of an electronic fund transfer, a cash-based fund transfer or a ticket voucher-based fund transfer. In another embodiment, an amount of funds transferred to a gaming establishment device (e.g., an EGM or a retail point-of-sale terminal) is funded via an electronic fund transfer or a cash-based fund transfer (but is not funded via any ticket voucher-based fund transfer). In another embodiment, an amount of funds transferred from a gaming establishment device (e.g., an EGM or a gaming table component) is cashed out via an electronic fund transfer or a cash-based fund transfer (but is not cashed out via any ticket voucher-based fund transfer). In another embodiment, an amount of funds transferred to a gaming establishment device (e.g., an EGM or a retail point-of-sale terminal) is funded via an electronic fund transfer or a ticket voucher-based fund transfer (but is not funded via any cash-based fund transfer). In another embodiment, an amount of funds transferred from a gaming establishment device (e.g., an EGM or a gaming table component) is cashed out via an electronic fund transfer or a ticket voucher-based fund transfer (but is not cashed out via any cash-based fund transfer). In another embodiment, an amount of funds transferred to a gaming establishment device (e.g., an EGM or a retail point-of-sale terminal) is funded via an electronic fund transfer (but is not funded via a cash-based fund transfer nor a ticket voucher-based fund transfer). In another embodiment, an amount of funds transferred from a gaming establishment device (e.g., an EGM or a gaming table component) is cashed out via an electronic fund transfer (but is not cashed out via a cash-based fund transfer nor a ticket voucher-based fund transfer).

It should be appreciated that any functionality or process of the present disclosure may be implemented via one or more servers (associated with or independent of any component of any system disclosed herein), one or more gaming establishment devices (e.g., a gaming device such as an EGM or a non-gaming device such as a point-of-sale terminal), one or more components of a gaming establishment device (such as a component of a gaming establishment management system supported by or otherwise located inside the gaming establishment device), or a mobile device application. For example, while certain data or information of the present disclosure is explained as being communicated from a gaming establishment device, or a component associated with a gaming establishment device to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a gaming establishment device or a component associated with a gaming establishment device, such functions, features or processes may alternatively be performed by one or more servers, or one or more mobile device applications, or one or more gaming establishment components, (ii) while certain functions, features or processes are described herein as being performed by one or more mobile device applications, such functions, features or processes may alternatively be performed by one or more servers, one or more gaming establishment devices, one or more components of a gaming establishment device, or one or more gaming establishment components, (iii) while certain functions, features or processes are described herein as being performed by one or more servers, such functions, features or processes may alternatively be performed by one or more gaming establishment devices, one or more components of a gaming establishment device, one or more mobile device applications, or one or more gaming establishment components, and (iv) while certain functions, features or processes are described herein as being performed by one or more gaming establishment components, such functions, features or processes may alternatively be performed by one or more gaming establishment devices, one or more components of a gaming establishment device, or one or more servers.

In certain embodiments, the above-described embodiments of the present disclosure may be implemented in accordance with or in conjunction with zero, one or more components of a gaming establishment fund management system (e.g., a cashless wagering system or a gaming establishment retail system), zero, one or more components of a gaming establishment patron management system, zero, one or more components of a retail point-of-sale system and/or zero, one or more gaming establishment devices. In these embodiments, such components of the gaming establishment fund management system, the gaming establishment patron management system, the retail point-of-sale system and/or the gaming establishment device each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the gaming establishment fund management system, the component of the gaming establishment patron management system, the component of the retail point-of-sale system and/or the gaming establishment device; (3) accessing memory to configure or reconfigure parameters in the memory according to indicia read from the component of the gaming establishment fund management system, the component of the gaming establishment patron management system, the component of the retail point-of-sale system and/or the gaming establishment device; (4) communicating with interfaces and the peripheral devices (such as input/output devices); and/or (5) controlling the peripheral devices. In certain embodiments, one or more components of the controller (such as the at least one processor) reside within a housing of the component of the gaming establishment fund management system, the component of the gaming establishment patron management system, the component of the retail point-of-sale system and/or the gaming establishment device, while in other embodiments, at least one component of the controller resides outside of the housing of the component of the gaming establishment fund management system, the component of the gaming establishment patron management system, the component of the retail point-of-sale system and/or the gaming establishment device.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the gaming establishment fund management system, the component of the gaming establishment patron management system, the component of the retail point-of-sale system and/or the gaming establishment device disclosed herein. In certain embodiments, the at least one memory device resides within the housing of the component of the gaming establishment fund management system, the component of the gaming establishment patron management system, the component of the retail point-of-sale system and/or the gaming establishment device, while in other embodiments at least one component of the at least one memory device resides outside of the housing of the component of the gaming establishment fund management system, the component of the gaming establishment patron management system, the component of the retail point-of-sale system and/or the gaming establishment device. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the gaming establishment fund management system, the component of the gaming establishment patron management system, the component of the retail point-of-sale system and/or the gaming establishment device; (2) associations between configuration indicia read from a component of the gaming establishment fund management system with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the gaming establishment fund management system, the component of the gaming establishment patron management system, the component of the retail point-of-sale system and/or the gaming establishment device to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the gaming establishment fund management system, the component of the gaming establishment patron management system, the component of the retail point-of-sale system and/or the gaming establishment device to control the component of the gaming establishment fund management system, the component of the gaming establishment patron management system, the component of the retail point-of-sale system and/or the gaming establishment device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a retail patron uses such a removable memory device in a component of the gaming establishment fund management system to implement at least part of the present disclosure. In other embodiments, part or all of the program code and/or the operating data is downloaded to the at least one memory device of the component of the gaming establishment fund management system, the component of the gaming establishment patron management system, the component of the retail point-of-sale system and/or the gaming establishment device through any suitable data network described above (such as an Internet or intranet).

The at least one memory device also stores a plurality of device drivers. Examples of different types of device drivers include device drivers for the component of the gaming establishment fund management system, the component of the gaming establishment patron management system, the component of the retail point-of-sale system and/or the gaming establishment device and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the gaming establishment fund management system, the component of the gaming establishment patron management system, the component of the retail point-of-sale system and/or the gaming establishment device. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the gaming establishment fund management system, the component of the gaming establishment patron management system, the component of the retail point-of-sale system and/or the gaming establishment device loads the new device driver from the at least one memory device to enable communication with the new device. For instance, one type of card reader in the component of the gaming establishment fund management system, the component of the gaming establishment patron management system, the component of the retail point-of-sale system and/or the gaming establishment device can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the component of the gaming establishment fund management system, the component of the gaming establishment patron management system, the component of the retail point-of-sale system and/or the gaming establishment device and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

The at least one output device includes at least one display device configured to display any suitable information. In certain embodiments, the display devices are connected to or mounted on a housing of the component of the gaming establishment fund management system, the component of the gaming establishment patron management system, the component of the retail point-of-sale system and/or the gaming establishment device. In various embodiments, the display devices serve as digital glass configured to aspects of the gaming establishment in which the component of the gaming establishment fund management system, the component of the gaming establishment patron management system, the component of the retail point-of-sale system and/or the gaming establishment device is located. In various embodiments, the component of the gaming establishment fund management system, the component of the gaming establishment patron management system, the component of the retail point-of-sale system and/or the gaming establishment device includes zero, one or more of the following display devices: (a) a central display device; (b) a player tracking display configured to display various information regarding a user's player tracking status; (c) a secondary or upper display device in addition to the central display device and the player tracking display; (d) a credit display configured to display a current quantity of credits, amount of cash, account balance, or the equivalent; and (e) a bet display. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In various embodiments, the at least one output device includes a payout device. In these embodiments, after the component of the gaming establishment fund management system, the component of the gaming establishment patron management system, the component of the retail point-of-sale system and/or the gaming establishment device receives an actuation, the component of the gaming establishment fund management system, the component of the gaming establishment patron management system, the component of the retail point-of-sale system and/or the gaming establishment device causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

In certain embodiments, the at least one output device is a sound generating device controlled by one or more sound cards. In one such embodiment, the sound generating device includes one or more speakers or other sound generating hardware and/or software configured to generate sounds, such as by playing music. In another such embodiment, the component of the gaming establishment fund management system, the component of the gaming establishment patron management system, the component of the retail point-of-sale system and/or the gaming establishment device provides dynamic sounds coupled with attractive multimedia images displayed on one or more of the display devices to provide an audio-visual representation or to otherwise display full-motion video with sound to attract users to the component of the gaming establishment fund management system, the component of the gaming establishment patron management system, the component of the retail point-of-sale system and/or the gaming establishment device. In certain embodiments, the component of the gaming establishment fund management system, the component of the gaming establishment patron management system, the component of the retail point-of-sale system and/or the gaming establishment device displays a sequence of audio and/or visual attraction messages during idle periods to attract potential users to the component of the gaming establishment fund management system, the component of the gaming establishment patron management system, the component of the retail point-of-sale system and/or the gaming establishment device. The videos may be customized to provide any appropriate information.

The at least one input device may include any suitable device that enables an input signal to be produced and received by the at least one processor of the component of the gaming establishment fund management system, the component of the gaming establishment patron management system, the component of the retail point-of-sale system and/or the gaming establishment device. In one embodiment, the at least one input device includes a payment device configured to communicate with the at least one processor of the component of the gaming establishment fund management system, the component of the gaming establishment patron management system, the component of the retail point-of-sale system and/or the gaming establishment device to fund the component of the gaming establishment fund management system, the component of the gaming establishment patron management system, the component of the retail point-of-sale system and/or the gaming establishment device. In certain embodiments, the payment device includes zero, one or more of: (a) a bill acceptor into which paper money is inserted; (b) a ticket acceptor into which a ticket or a voucher is inserted; (c) a reader or a validator for credit cards, debit cards, or credit slips into which a credit card, debit card, or credit slip is inserted; (d) a player identification card reader into which a player identification card is inserted; or (e) any suitable combination thereof. In one embodiment, the at least one input device includes a payment device configured to enable the component of the gaming establishment fund management system, the component of the gaming establishment patron management system, the component of the retail point-of-sale system and/or the gaming establishment device to be funded via an electronic funds transfer, such as a transfer of funds from a bank account. In another embodiment, the component of the gaming establishment fund management system, the component of the gaming establishment patron management system, the component of the retail point-of-sale system and/or the gaming establishment device includes a payment device configured to communicate with a mobile device of a user, such as a mobile phone, a radio frequency identification tag, or any other suitable wired or wireless device, to retrieve relevant information associated with that user to fund the component of the gaming establishment fund management system, the component of the gaming establishment patron management system, the component of the retail point-of-sale system and/or the gaming establishment device. When the component of the gaming establishment fund management system, the component of the gaming establishment patron management system, the component of the retail point-of-sale system and/or the gaming establishment device is funded, the at least one processor determines the amount of funds entered and displays the corresponding amount.

In various embodiments, the at least one input device includes a plurality of buttons that are programmable by the component of the gaming establishment fund management system, the component of the gaming establishment patron management system, the component of the retail point-of-sale system and/or the gaming establishment device operator to, when actuated, cause the component of the gaming establishment fund management system, the component of the gaming establishment patron management system, the component of the retail point-of-sale system and/or the gaming establishment device to perform particular functions. For instance, such buttons may be hard keys, programmable soft keys, or icons icon displayed on a display device of the component of the gaming establishment fund management system, the component of the gaming establishment patron management system, the component of the retail point-of-sale system and/or the gaming establishment device that are actuatable via a touch screen of the component of the gaming establishment fund management system, the component of the gaming establishment patron management system, the component of the retail point-of-sale system and/or the gaming establishment device or via use of a suitable input device of the component of the gaming establishment fund management system, the component of the gaming establishment patron management system, the component of the retail point-of-sale system and/or the gaming establishment device. In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the component of the gaming establishment fund management system, the component of the gaming establishment patron management system, the component of the retail point-of-sale system and/or the gaming establishment device by touching the touch screen at the appropriate locations.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the component of the gaming establishment fund management system, the component of the gaming establishment patron management system, the component of the retail point-of-sale system and/or the gaming establishment device. In one embodiment, a user input device docking region is provided, and includes a power distribution component that is configured to recharge a user input device without requiring metal-to-metal contact. In one embodiment, the at least one power distribution component is configured to distribute power to one or more internal components of the component of the gaming establishment fund management system, the component of the gaming establishment patron management system, the component of the retail point-of-sale system and/or the gaming establishment device, such as one or more rechargeable power sources (e.g., rechargeable batteries) located at the component of the gaming establishment fund management system, the component of the gaming establishment patron management system, the component of the retail point-of-sale system and/or the gaming establishment device.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the component of the gaming establishment fund management system, the component of the gaming establishment patron management system, the component of the retail point-of-sale system and/or the gaming establishment device; detecting the presence and/or identity of various persons (e.g., users, casino employees, etc.), devices (e.g., user input devices), and/or systems within a predetermined proximity to the component of the gaming establishment fund management system, the component of the gaming establishment patron management system, the component of the retail point-of-sale system and/or the gaming establishment device.

The at least one data preservation component is configured to detect or sense one or more events and/or conditions that, for example, may result in damage to the component of the gaming establishment fund management system, the component of the gaming establishment patron management system, the component of the retail point-of-sale system and/or the gaming establishment device and/or that may result in loss of information associated with the component of the gaming establishment fund management system, the component of the gaming establishment patron management system, the component of the retail point-of-sale system and/or the gaming establishment device. Additionally, the data preservation system may be operable to initiate one or more appropriate action(s) in response to the detection of such events/conditions.

The at least one motion/gesture analysis and interpretation component is configured to analyze and/or interpret information relating to detected user movements and/or gestures to determine appropriate user input information relating to the detected user movements and/or gestures. For example, in one embodiment, the at least one motion/gesture analysis and interpretation component is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source enables the component of the gaming establishment fund management system, the component of the gaming establishment patron management system, the component of the retail point-of-sale system and/or the gaming establishment device to operate in a mobile environment.

The at least one geolocation module is configured to acquire geolocation information from one or more remote sources and use the acquired geolocation information to determine information relating to a relative and/or absolute position of the component of the gaming establishment fund management system, the component of the gaming establishment patron management system, the component of the retail point-of-sale system and/or the gaming establishment device. For example, in one implementation, the at least one geolocation module is configured to receive GPS signal information for use in determining the position or location of the component of the gaming establishment fund management system, the component of the gaming establishment patron management system, the component of the retail point-of-sale system and/or the gaming establishment device. In another implementation, the at least one geolocation module is configured to receive multiple wireless signals from multiple remote devices (e.g., component of the gaming establishment fund management system, the gaming establishment patron management system, the retail point-of-sale system and/or the gaming establishment devices, servers, wireless access points, etc.) and use the signal information to compute position/location information relating to the position or location of the component of the gaming establishment fund management system, the component of the gaming establishment patron management system, the component of the retail point-of-sale system and/or the gaming establishment device.

The at least one user identification module is configured to determine the identity of the current user or current owner of the component of the gaming establishment fund management system, the component of the gaming establishment patron management system, the component of the retail point-of-sale system and/or the gaming establishment device. For example, in one embodiment, the current user is required to perform a login process at the component of the gaming establishment fund management system, the component of the gaming establishment patron management system, the component of the retail point-of-sale system and/or the gaming establishment device in order to access one or more features. Alternatively, the component of the gaming establishment fund management system, the component of the gaming establishment patron management system, the component of the retail point-of-sale system and/or the gaming establishment device is configured to automatically determine the identity of the current user based on one or more external signals, such as an RFID tag or badge worn by the current user and that provides a wireless signal to the component of the gaming establishment fund management system, the component of the gaming establishment patron management system, the component of the retail point-of-sale system and/or the gaming establishment device that is used to determine the identity of the current user. In at least one embodiment, various security features are incorporated into the component of the gaming establishment fund management system, the component of the gaming establishment patron management system, the component of the retail point-of-sale system and/or the gaming establishment device to prevent unauthorized users from accessing confidential or sensitive information.

The at least one information filtering module is configured to perform filtering (e.g., based on specified criteria) of selected information to be displayed at one or more displays of the component of the gaming establishment fund management system, the component of the gaming establishment patron management system, the component of the retail point-of-sale system and/or the gaming establishment device.

In various embodiments, the component of the gaming establishment fund management system, the component of the gaming establishment patron management system, the component of the retail point-of-sale system and/or the gaming establishment device includes a plurality of communication ports configured to enable the at least one processor of the component of the gaming establishment fund management system, the component of the gaming establishment patron management system, the component of the retail point-of-sale system and/or the gaming establishment device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, the component of the gaming establishment fund management system, the component of the gaming establishment patron management system, the component of the retail point-of-sale system and/or the gaming establishment device has a support structure, housing, or cabinet that provides support for a plurality of the input devices and the output devices of the component of the gaming establishment fund management system, the component of the gaming establishment patron management system, the component of the retail point-of-sale system and/or the gaming establishment device.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A gaming establishment fund management system comprising:
   a processor; and
   a memory device that stores a plurality of instructions that, when executed by the processor responsive to a request to complete a purchase transaction at a point-of-sale terminal associated with a gaming establishment retail point-of-sale system, cause the processor to:
   responsive to a determination that a balance of a gaming establishment retail account associated with a user and maintained by the gaming establishment fund management system includes at least an amount of funds associated with the purchase transaction;
   cause a completion of the purchase transaction, wherein the completed purchase transaction is associated with a first transaction identifier and the completed purchase transaction is associated with a transfer of an amount of funds to complete the purchase transaction from the gaming establishment retail account to an account associated with the gaming establishment retail point-of-sale system, and
   following the completion of the purchase transaction and responsive to a completion of a separately occurring tip transaction associated with the purchase transaction, associate the first transaction identifier with the completed tip transaction such that both the completed purchase transaction and the completed tip transaction are each individually accessible from the same first transaction identifier.

2. The gaming establishment fund management system of claim 1, wherein a request to complete the tip transaction associated with the purchase transaction occurs prior to the completion of the purchase transaction.

3. The gaming establishment fund management system of claim 1, wherein a request to complete the tip transaction occurs at the point-of-sale terminal.

4. The gaming establishment fund management system of claim 1, wherein a determination to complete the tip transaction associated with the purchase transaction is based on a determination that the balance of the gaming establishment retail account associated with the user includes at least an amount of funds to complete the tip transaction.

5. The gaming establishment fund management system of claim 1, wherein a determination to complete the tip transaction associated with the purchase transaction is based on the tip transaction complying with a tipping control.

6. The gaming establishment fund management system of claim 5, wherein the tipping control is associated with an identity of a user that requested the tip transaction.

7. The gaming establishment fund management system of claim 5, wherein the tipping control is associated with an amount of the tip transaction relative to the amount of funds associated with the purchase transaction.

8. The gaming establishment fund management system of claim 1, wherein the memory device stores a plurality of further instructions that, when executed by the processor responsive to the completion of the tip transaction, cause the processor to cause a display, by a display device, of the purchase transaction and the tip transaction as a single transaction.

9. The gaming establishment fund management system of claim 1, wherein the completion of the tip transaction comprising causing a transfer of an amount of funds to complete the tip transaction from the gaming establishment retail account to the account associated with the gaming establishment retail point-of-sale system.

10. A gaming establishment fund management system comprising:
   a processor; and
   a memory device that stores a plurality of instructions that, when executed by the processor responsive to a request, received at a point-of-sale terminal associated with a gaming establishment retail point-of-sale system to complete a purchase transaction associated with a first amount of funds and a separately occurring request, received at the point-of-sale terminal, to complete a tip transaction associated with a second amount of funds, cause the processor to:
      determine if a balance of a gaming establishment retail account associated with a user and maintained by the gaming establishment fund management system includes at least a third amount of funds, the third amount of funds comprising a sum of the first amount of funds and the second amount of funds, and
      responsive to the balance of the gaming establishment account associated with the user including at least the third amount of funds, cause a completion of the purchase transaction and the tip transaction as a single transaction such that the purchase transaction and the tip transaction are each individually accessible as the same single transaction.

11. The gaming establishment fund management system of claim 10, wherein the purchase transaction and the tip transaction are associated with a single transaction identifier.

12. A method of operating a gaming establishment fund management system, the method comprising:
   responsive to a request to complete a purchase transaction at a point-of-sale terminal associated with a gaming establishment retail point-of-sale system:
      responsive to a determination that a balance of a gaming establishment retail account associated with a user and maintained by the gaming establishment fund management system includes at least an amount of funds associated with the purchase transaction;
      causing, by a processor, a completion of the purchase transaction, wherein the completed purchase transaction is associated with a first transaction identifier and the completed purchase transaction is associated with a transfer of an amount of funds to complete the purchase transaction from the gaming establishment retail account to an account associated with the gaming establishment retail point-of-sale system, and
      following the completion of the purchase transaction and responsive to a completion of a separately occurring tip transaction associated with the purchase transaction, associating, by the processor, the first transaction identifier with the completed tip transaction such that both the completed purchase transaction and the completed tip transaction are each individually accessible from the same first transaction identifier.

13. The method of claim 12, wherein a request to complete the tip transaction associated with the purchase transaction occurs prior to the completion of the purchase transaction.

14. The method of claim 12, wherein a request to complete the tip transaction occurs at the point-of-sale terminal.

15. The method of claim 12, wherein a determination to complete the tip transaction associated with the purchase transaction is based on a determination that the balance of the gaming establishment retail account associated with the user includes at least an amount of funds to complete the tip transaction.

16. The method of claim 12, wherein a determination to complete the tip transaction associated with the purchase transaction is based on the tip transaction complying with a tipping control.

17. The method of claim 16, wherein the tipping control is associated with an identity of a user that requested the tip transaction.

18. The method of claim 16, wherein the tipping control is associated with an amount of the tip transaction relative to the amount of funds associated with the purchase transaction.

19. The method of claim 12, further comprising, responsive to the completion of the tip transaction, displaying, by a display device, the purchase transaction and the tip transaction as a single transaction.

20. The method of claim 12, wherein the completion of the tip transaction comprising causing a transfer of an amount of funds to complete the tip transaction from the gaming establishment retail account to the account associated with the gaming establishment retail point-of-sale system.

* * * * *